(12) United States Patent
Albers et al.

(10) Patent No.: US 12,509,865 B2
(45) Date of Patent: Dec. 30, 2025

(54) WATER SUPPLY AND DISTRIBUTION SYSTEM ON-BOARD AN AIRCRAFT AND METHOD FOR OPERATING SUCH SYSTEM

(71) Applicant: Airbus Operations GmbH, Hamburg (DE)

(72) Inventors: Frederik Albers, Hamburg (DE); Hannes Muller, Hamburg (DE); Frank Schneider, Hamburg (DE); Michael Rempe, Hamburg (DE); Tim Lubbert, Hamburg (DE); Axel Schreiner, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 104 days.

(21) Appl. No.: 18/544,906

(22) Filed: Dec. 19, 2023

(65) Prior Publication Data
US 2024/0200311 A1    Jun. 20, 2024

(30) Foreign Application Priority Data
Dec. 20, 2022    (EP) .................................. 22215097

(51) Int. Cl.
 *E03B 7/07*    (2006.01)
 *E03B 11/06*    (2006.01)
 *B64D 11/02*    (2006.01)

(52) U.S. Cl.
 CPC .............. *E03B 7/075* (2013.01); *E03B 11/06* (2013.01); *B64D 11/02* (2013.01)

(58) Field of Classification Search
 CPC ................................ E03B 7/075; B64D 11/02
 See application file for complete search history.

(56) References Cited

U.S. PATENT DOCUMENTS 5,261,440 A * 11/1993 Frank ..................... B64D 11/02
                                                                        137/208
5,303,739 A * 4/1994 Ellgoth ................... B64D 11/02
                                                                        137/341

(Continued)

FOREIGN PATENT DOCUMENTS

| EP | 3385361 A1 | 10/2018 |
| EP | 3738880 A1 | 11/2020 |
| EP | 4080297 A1 | 10/2022 |

OTHER PUBLICATIONS

European Search Report for U.S. Appl. No. 22/215,097 dated May 30, 2023.

*Primary Examiner* — Reinaldo Sanchez-Medina
(74) *Attorney, Agent, or Firm* — KDW Firm PLLC

(57) ABSTRACT

A method for operating an on-board water supply and distribution system of an aircraft includes a central water tank, central pump, consumer assemblies each including a supply device to supply water, and a high-pressure conduit system. The high-pressure conduit system connects the downstream side and consumer assemblies and is configured where the central pump can deliver water from the downstream side to the consumer assemblies. The method includes operating the central pump where water in the high-pressure conduit system is pressurized to a predetermined first pressure, operating the consumer assemblies where in each of the consumer assemblies the connection between the buffer tank of the consumer assembly and the high-pressure conduit system is in a closed position, monitoring pressure for a predetermined first period of time, and providing a first failure signal when pressure drops below a predetermined second pressure within the first period of time.

20 Claims, 6 Drawing Sheets

(56) References Cited

U.S. PATENT DOCUMENTS

| | | | |
|---|---|---|---|
| 10,590,634 B2* | 3/2020 | Giamati | B64D 11/04 |
| 11,022,517 B2* | 6/2021 | Maroju | G01M 3/36 |
| 2006/0260691 A1 | 11/2006 | Davidoff | |
| 2012/0111432 A1* | 5/2012 | Harr | B64D 11/02 |
| | | | 137/590 |
| 2014/0158242 A1 | 6/2014 | Schreiner et al. | |
| 2018/0291595 A1 | 10/2018 | Lubbert | |
| 2022/0064039 A1* | 3/2022 | Nakama | E03D 9/02 |

* cited by examiner

WATER SUPPLY AND DISTRIBUTION SYSTEM ON-BOARD AN AIRCRAFT AND METHOD FOR OPERATING SUCH SYSTEM

TECHNICAL FIELD

The disclosure herein is directed to a method for operating a water supply and distribution system on-board an aircraft. The disclosure herein is further directed to a water supply and distribution system and an aircraft comprising such system.

BACKGROUND

Conventional water supply and distribution systems on-board commercial aircraft comprise pipework made from rigid pipes, i.e., rigid plumbing. Through the rigid pipes potable water is supplied from a central water tank towards consumer assemblies such as sinks and toilets in a lavatory or steam ovens and sinks in a galley.

However, recently a high-pressure water system was introduced and it is described in EP 3 385 361 A1. Such industry-optimized water system architecture is based on the concept of a reduction of pipe cross-sections accompanied by an increase in pressure level as well as a change of pressurization technology, i.e., rather than employing pressurized central water tanks, displacement pumps are used, but other types of pumps may also be used in such high-pressure systems. With such pumps water in a so-called high-pressure conduit system downstream the pump is pressurized and conveyed at such increased pressures. This adaption allows massive savings, e.g., weight, installation time, equipment cost etc.

In any kind of water supply system but especially in case of those pressurized systems there is the risk that due to leaks in the monuments and the high-pressure conduit system large amounts water may escape into areas of the aircraft such as spaces behind claddings or below floor elements where the components of the conduit system are installed where even large amount of accumulations of water cannot be discovered without disassembling claddings or floor components. Similarly, visual inspection of the high-pressure conduit system and the components of it in monuments also require the disassembly of the floor or the cladding members which in turn requires a lot of efforts.

Furthermore, leaking water can, for example, damage sensitive electronic equipment which is especially critical regarding safety when the avionics bay is affected, because this area houses the flight control computers. In addition, large amounts of water mean a lot of weight, which can have a safety-relevance since it results in a shift in the center of gravity. Especially, in permanent cold-weather operation, when the drainage openings in the aircraft fuselage cannot drain the leaking water, an ice shell can form in the aircraft bildge over several legs, which can have a mass of several hundred kilograms.

SUMMARY

Hence, it is an object of the disclosure herein to provide for monitoring of the integrity of the water supply system during operation without the need to disassemble components of the interior of the aircraft.

The aforementioned object underlying the disclosure herein is solved by a the system comprising a central water tank, a central pump, having an upstream side and a downstream side and being capable of conveying and pressurizing water from the upstream side to the downstream side, a plurality of consumer assemblies, each consumer assembly comprising a supply device, such as a water faucet, toilet rinse valve in a lavatory or a sink and a steam oven in a galley, and each consumer assembly being configured to supply water via the supply device, and a high-pressure conduit system, wherein the central water tank is connected to the upstream side, wherein the high-pressure conduit system connects the downstream side with the plurality of consumer assemblies, with the high-pressure conduit system being configured such that the central pump, when operating is capable of delivering water from the downstream side to the consumer assemblies, the method comprising the following steps:

operating the central pump such that water in the high-pressure conduit system is pressurized to a predetermined first pressure;

operating the consumer assemblies such that in each of the consumer assemblies the connection between the buffer tank of the consumer assembly and the high-pressure conduit system is in a closed position;

monitoring the pressure in the high-pressure conduit system for a predetermined first period of time; and providing a first failure signal when the pressure in the high-pressure conduit system drops below a predetermined second pressure within the first period of time.

Thus, the method of the disclosure herein is performed with a pressurized on-board water supply and distribution system as known from the prior art and comprising a central water tank, a central pump and a plurality of consumer assemblies comprising a buffer tank and a supply device. Further, the consumer assemblies are connected with the central pump via a high-pressure conduit system.

Here, it is to be noted that it is preferred that either the central pump is provided with a backflow prevention mechanism, which prevents water and/or a gas to flow in an opposite direction from the downstream side to the upstream side when it is not operated, or an additional backflow prevention valve is provided which is closed, when the central pump is not operated and prevents water and/or a gas to flow from the downstream side to the upstream side.

In this respect, it is to be noted that in a preferred embodiment the high-pressure conduit system comprises a pressure reservoir that is configured such that it applies a pressure at a reservoir pressure to the high-pressure conduit system after the operation of the central pump has been stopped with the reservoir pressure and the pressure in the high-pressure conduit system at that point in time where the central pump was stopped being the same. Such pressure reservoir may be in the form of a tank containing a gas volume and an elastic membrane that separates the gas volume from a further volume being connected to the high-pressure conduit system and receiving water and/or gas such as ambient air from the conduit system, i.e., the reservoir is configured in a similar form as in conventional compressors. However, other configurations are conceivable as well. A component of the high-pressure conduit system having compressibility such the aforementioned pressure reservoir can also be generated by providing shape elasticity of a hose element of the high-pressure conduit system or other compressible elements with spring properties may be integrated into the high-pressure conduit system.

With the method of the disclosure herein is a first step that the central pump is operated such that the water in the high-pressure conduit system is pressurized to a predetermined first pressure. At least after this first pressure or a pressure level has been reached, the consumer assemblies are operated such that in each of the consumer assemblies the connection between the buffer tank of the consumer assembly and the high-pressure conduit system is in a closed position.

In parallel the pressure in the high-pressure conduit system is monitored for a first period of time. In case the pressure in the high-pressure conduit system drops below a predetermined second pressure within this first period of time, a first failure signal is provided. The provision of a failure signal may be in such a form that the control unit of the on-board water supply and distribution system generates such first failure signal which is then further provided to the aircraft data network of the aircraft in which the entire system is installed. In particular, due to the first failure signal a specific failure message may be displayed on control panels such as the flight attendant panel and/or the first failure signal will cause that the central pump of the water supply and distribution system will automatically be switched off.

In case the pressure in the high-pressure conduit system does not drop below the predetermined second pressure but stays above, in a preferred embodiment a test-passed signal will be generated by the control unit which signal may cause that a corresponding message will be displayed on the aforementioned panels. It is further preferred that this information is also stored onboard in the aircraft data base. This offers evidence for the maintenance staff when the system was tested successfully and when the system started to have a water leakage.

When performing the test as specified by the method of the disclosure herein, a drop of the water pressure in the high-pressure conduit system below the predetermined second pressure indicates that there is a leak in the high-pressure conduit system, i.e., with this procedure it can simply be determined whether there is a leak in the high-pressure conduit system. In particular, water cannot escape from the high-pressure conduit system except there is a leak, so that in case the entire system is properly working, the water pressure in the system should remain constant above a certain level after an equilibrium level has been reached.

Thus, the method of the disclosure herein allows for quickly obtaining general information about the status of the water supply and distribution system without the need to disassembly components of a cladding or floor and to visually inspect the system.

In a preferred embodiment or as an alternative of the above method, the consumer assemblies comprise an inlet valve connecting the high-pressure conduit system with the consumer assembly wherein the method further comprises the following steps:
  pressurizing gas, preferably ambient air, in the high-pressure conduit system to a predetermined third pressure, preferably by the central pump;
  operating the consumer assemblies such that in each of the consumer assemblies the inlet valve is in a closed position, so that air is prevented from passing from the high-pressure conduit system into the consumer assembly;
  monitoring the pressure in the high-pressure conduit system for a predetermined second period of time; and
  providing a second failure signal when the pressure in the high-pressure conduit system drops below a predetermined fourth pressure within the second period of time.

In this embodiment of the disclosure herein the inlet valves of consumer assemblies connecting the high-pressure conduit system with the inlet of the buffer tanks are kept in a closed position and the gas, preferably ambient air, in the high-pressure conduit system is pressurized, preferably by the central pump, until a predetermined third pressure is reached which may deviate from the first pressure but may also have the same level. In this regard it is to be noted that the high pressure conduit system as well as the central tank need to be drained.

Furthermore, it is to be noted that approaches other than the central pump may by employed as the source for pressurized gas. In particular, it is conceivable that a ground pressure source is used or that the high-pressure conduit system is configured such that it comprises an interface which can connected to an interface of the cabin pressurization system or, as an alternative, it may also be connected to an interface of the bleed air system.

Subsequently the pressure in the high-pressure conduit system is monitored for a second period of time, and in case the pressure in the high-pressure conduit system drops below a predetermined fourth pressure level within that period of time, a second failure signal is provided. Here, the second failure signal may be provided the same way as in the case of the first failure signal, i.e., it may be in the form of a failure message to be transmitted through the aircraft data network, and it may also affect that the central pump is automatically switched off. In turn, in case the gas pressure in the high-pressure conduit system is maintained a test-passed signal is transmitted through the aircraft data network.

This second test with the inlet valves being in the closed position indicates that the high-pressure conduit system has a leak, when a pressure drop below the fourth pressure level is determined within the second period of time. Hence, this test may either be used to double check whether the high-pressure conduit system is operating properly or it can be employed as a supplementary test to be conducted when the method discussed before delivers the first failure signal.

In another preferred embodiment, the method further comprises the following steps:
  operating the central pump such that water is conveyed from the upstream side to the downstream side and into the high-pressure conduit system;
  monitoring the pressure in the high-pressure conduit system for a predetermined third period of time; and
  providing a third failure signal when the pressure in the high-pressure conduit system remains below a predetermined fifth pressure within the third period of time.

In this preferred embodiment by monitoring whether the pressure in the high-pressure conduit system reaches the third pressure level within a third period of time, it can be assessed whether the pressure build-up in the high-pressure conduit system is sufficiently quick. In case this criterion is not met, i.e., the predetermined fifth pressure is not reached within the third period of time, this indicates that the central pump is malfunctioning, that one or more small leaks in the high-pressure conduit system or in at least one of the consumer assemblies are present or that there is a blockage in the water supply line to the upstream side of the central pump. The third failure signal generated in the latter case may then be treated in the same manner as in case of the aforementioned failure signals. In addition, in case the pressure exceeds the fifth pressure within the third period of time, a test-passed signal will be generated and transmitted via the aircraft data network.

In a further preferred embodiment, the method further comprises the following steps:
  operating the central pump such that water is conveyed from the upstream side to the downstream side and into the high-pressure conduit system;

monitoring the flow of water from the upstream side to the downstream side and into the high-pressure conduit system for a predetermined fourth period of time; and providing the third failure signal when the flow of water from the upstream side to the downstream side and into the high-pressure conduit system remains below a predetermined first flow level within the fourth period of time.

As an alternative or in addition to monitoring the pressure build up in the high-pressure conduit system, in this preferred embodiment the flow through the central pump is analyzed so that the flow through the pump is used as an alternative or supplementary criterion whether the supply pipe to the central pump or conduits in the high-pressure conduit system are blocked at least to a certain extent which would slow down the pressure build-up and the flow through the pump. To this end, the flow of water can be measured by a flow sensor or inverse methods can be used for example the rotational speed of a pump can be used to derive the flow if the pressure is measured by a pressure sensor downstream the pump.

In a further preferred embodiment of the disclosure herein at least one of the plurality of consumer assemblies comprises a buffer tank connected to the high-pressure conduit system and the at least one consumer assembly being configured to supply water from the buffer tank via the supply device, and the method further comprises the following steps:

operating the central pump such that water is conveyed from the upstream side to the downstream side, into the high-pressure conduit system and into the buffer tank of at least one consumer assembly;

monitoring whether the level in the buffer tank of the at least one consumer assembly increases by more than a predetermined first filling level difference;

providing a fifth failure signal when the level in the buffer tank of the at least one consumer assembly has not increased by more than the predetermined first filling level difference within a predetermined fifth period of time.

With this preferred embodiment of the disclosure herein in which the time is monitored which is required to increase in one of the buffers of the consumer assemblies of the system the filling level, it can further be analyzed whether the sections of the conduits of the high-pressure conduit system forming the path between the central pump and the respective buffer tank are free of any leaks or blockages. Thus, when the level in the buffer tank of one of the consumer assemblies has not increased by more than the first filling level difference within the predetermined fifth period of time, a fourth failure signal may be transmitted, e.g., via the aircraft data network. In addition, in case the level in the buffer tank exceeds the first filling level within the fifth period of time, a test-passed signal may again be generated and transmitted via the aircraft data network.

In a further preferred embodiment, the method of the disclosure herein comprises the step of monitoring the flow of water from the upstream side to the downstream side and into the high-pressure conduit system wherein the predetermined fifth period of time is calculated based on the monitored flow of water from the upstream side to the downstream side and into the high-pressure conduit system. In this preferred embodiment there is the advantage that the fifth period of time considered to be required to effect the change of the filling level in respective buffer tank is calculated based on the actual flow passing through the central pump. Hence, the criterion applied to assess whether the path to the respective buffer tank is free of any leaks or blockages is adapted to the actual conditions in the high-pressure conduit system and the central pump.

In a further preferred embodiment, in the method of the disclosure herein each of the plurality of consumer assemblies comprises a buffer tank connected to the high-pressure conduit system, the central pump is operated such that water is conveyed from the upstream side to the downstream side, into the high-pressure conduit system and into the buffer tank of each of the consumer assemblies, wherein the buffer tanks are subsequently filled such that at one point in time only one of the consumer assemblies is supplied with water, wherein it is monitored whether the level in the buffer tank of each of the consumer assemblies increases by the predetermined first filling level difference and wherein the fourth failure signal is provided when for at least one of the consumer assemblies the time between the start of the filling of its buffer tank and of reaching the predetermined first filling level difference exceeds the predetermined fifth period of time.

Thus, in this preferred embodiment the buffer tank of each of the consumer assemblies is separately filled and the time required for filling the respective buffer tank is monitored. When for at least one of the consumer assemblies it is detected that the time required to fill its buffer tank exceeds the first predetermined period of time, this may have two reasons. Firstly, this may indicate that the consumer assembly itself comprises a leak or a blockage. Alternatively, the high-pressure conduit system and especially the connection between the central pump and the respective consumer assembly comprises a blockage or a leak is present.

By subsequently filling the buffer tanks of the consumer assemblies the aforementioned testing can be conducted for each of the consumer assemblies separately so that it is possible to further determine the position of an already detected leak in the high-pressure conduit system.

In another preferred embodiment of the disclosure herein, at least one of the plurality of consumer assemblies comprises a buffer tank connected to the high-pressure conduit system and each consumer assembly is configured to supply water from the buffer tank via the supply device, and the method further comprises the following steps:

operating the central pump such that water is conveyed from the upstream side to the downstream side, into the high-pressure conduit system and into the buffer tank of the at least one consumer assembly;

monitoring whether the level in the buffer tank of the at least one consumer assembly increases by more than a predetermined second filling level difference;

stopping operation of the central pump when the level in the buffer tank of the at least one of the consumer assemblies has increased by the predetermined second filling level difference;

monitoring whether the level in the buffer tank of the at least one consumer assembly decreases by more than a predetermined third filling level difference; and providing a fifth failure signal when the level in the buffer tank of the at least one of the consumer assemblies has decreased by more than the predetermined third filling level difference within a predetermined sixth period of time.

In this preferred embodiment the buffer tank of one of the consumer assemblies is initially filled by a predetermined second filling level difference, and when this difference has been reached, the central pump is switched off. Preferably an inlet valve connecting the buffer tank of this consumer assembly and the high-pressure conduit system and the respective supply device are also closed, when the second predetermined filling level difference has been reached. In the following, the level in the buffer tank is monitored, and when the level in the respective buffer tank decreases by more than a predetermined third filling level difference, a fifth failure signal is provided to the aircraft data network and treated correspondingly. The fifth failure signal is generated because a decrease of the level in one of the buffer tanks even though the supply device is switched off and water withdrawal by consumers may not take place and the inlet valve is in closed position, indicates that the respective consumer assembly is malfunctioning and comprises a leak. In addition, in case the change of the level in the buffer tank stays below the third filling level difference within the sixth period of time, again a test-passed signal may be generated and transmitted via the aircraft data network.

In another preferred embodiment the plurality of consumer assemblies comprises a buffer tank connected to the high-pressure conduit system via an inlet valve and each consumer assembly is configured to supply water from the buffer tank via the supply device. In this preferred embodiment, the method further comprises the following steps:

operating the central pump such that water is conveyed from the upstream side to the downstream side and into the high-pressure conduit system;

monitoring the flow of water from the upstream side to the downstream side and into the high-pressure conduit system for a predetermined seventh period of time;

operating a first group of the consumer assemblies such that the inlet valve is open during the seventh period of time, so that water is supplied to the buffer tank of the consumer assemblies of the first group;

operating a second group of the consumer assemblies such that water is supplied from the buffer tank via the supply device of the consumer assemblies of the second group with the flow of supplied water through the supply device being monitored during the seventh period of time;

monitoring the level in the buffer tanks of the consumer assemblies of the first and the second group of consumer assemblies during the seventh period of time;

determining from the change of the monitored level in the buffer tank of the consumer assemblies of the first and the second group of consumer assemblies the total change of the amount of water received in the buffer tanks of the consumer assemblies in the seventh period of time;

determining by the control unit from the monitored flow of water from the upstream side to the downstream side the total amount of water supplied by the central pump to the consumer assemblies in the seventh period of time;

determining from the monitored flow of supplied water from the buffer tanks through the supply device of the consumer assemblies of the second group of consumer assemblies the amount of water supplied by the consumer assemblies in the seventh period of time; and providing a sixth failure signal when the change of the amount of water received in the buffer tanks in the seventh period of time differs from the total amount of water supplied by the central pump minus the amount of water supplied by the second group of consumer assemblies in the seventh period of time by more than a first predetermined value.

In this preferred embodiment the central pump is operated such that water is supplied to at least a first group of the consumer assemblies and its buffer tanks. However, it is of course conceivable, that the first group includes each of the consumer assemblies so that each consumer assembly is supplied with water via the in the central pump. During the same period of time, i.e., the seventh period of time, in which the first group of consumer assemblies is supplied with water, at least a second group of the consumer assemblies is operated such that water from its buffer tanks is supplied via the supply device.

Furthermore, during the seventh period of time that the flow through the central pump is monitored and integrated in the same is done in relation to the flows from the buffer tanks to the respective supply device is of the consumer assemblies. Moreover, the change of the level in the buffer tanks is monitored as well.

In case the sum of the amount of water supplied by the supply devices and the amount of water resulting from the changes of the level in buffer tanks does not correspond to the amount of water supplied by the central pump, a leak must be present either in the high-pressure conduit system or in one of the monuments. Hence, when there is a mismatch a sixth failure signal will be generated and preferably transmitted via the aircraft data network. In addition, it is of course also conceivable that in case the amounts match with each other, a test-passed signal is generated.

In a further preferred embodiment, each of the plurality of consumer assemblies comprises a buffer tank connected to the high-pressure conduit system and each consumer assembly is configured to supply water from the buffer tank via the supply device, wherein the method according to the disclosure herein further comprises the following steps:

operating the supply device of one of the consumer assemblies such that water from the buffer tank of the one consumer assembly is supplied via the supply device for an eighth period of time;

monitoring the filling level in the buffer tank of the one consumer assembly during the eighth period of time; and providing a seventh failure signal when the change of filing level in the buffer tank of the one consumer assembly during the eighth period of time is below a second predetermined value.

With this preferred embodiment the supply device and the connection between the buffer tank and the supply device is checked whether there is any kind of blockage. In such case the drop of the filling level in the respective buffer tank would remain below a predetermined value. If this has been detected, a seventh failure signal is generated and transmitted via the aircraft data network. On the other hand, if the decrease in filling level is above the second predetermined value, a test-passed signal may be generated. Therefore, with this preferred embodiment it is possible to check whether the supply devices of the consumer assemblies are operating properly.

In another preferred embodiment the method of the disclosure herein comprises the following steps:

pressurizing gas, preferably ambient air, in at least one consumer assembly in its line connecting the high-pressure conduit system to the supply device;

monitoring the pressure in the line connecting the supply device to the high-pressure conduit system of the at least one consumer assembly for a predetermined nineth period of time; and providing an eighth failure signal when the pressure in the line connecting the supply device to the high-pressure conduit system of the at least one consumer assembly drops below a predetermined sixth pressure within the nineth period of time.

With this preferred embodiment it can be tested, preferably, when the supply device such as a toilet or a faucet are in a closed position, whether there is a leak in the conduits of a consumer assembly. In this regard it is to be noted that this method can also be applied in case of consumer assemblies having a buffer tank. Then the line being pressurized connects the supply device indirectly with the high-pressure conduit system. It is further preferred, when a pump provided in the line connecting the supply device with the high-pressure conduit system is employed to the pressurize the gas.

Furthermore, it is to be noted that for conducting this preferred embodiment of the method of the disclosure herein it is a requirement that the conduits in the consumer assembly in question are drained so that gas in these conduits can be pressurized.

When it is detected that the gas pressure in the pressurized conduit drops below the predetermined threshold, a corresponding failure signal is generated and transmitted through the aircraft data network (ADN).

In a further preferred embodiment at least one of the plurality of consumer assemblies comprises a buffer tank connected to the high-pressure conduit system and the at least one consumer assembly being configured to supply water from the buffer tank via the supply device, wherein a pump is provided in a line connecting the buffer tank and the supply device of the at least one consumer assembly and wherein the method further comprises the following steps:
  operating the pump of the at least one consumer assembly such that water in the line connecting the buffer tank and the supply device of the at least one consumer assembly is pressurized to a predetermined seventh pressure;
  monitoring the pressure in the line connecting the buffer tank and the supply device of the at least one consumer assembly for a predetermined tenth period of time; and
  providing a nineth failure signal when the pressure in the line connecting the buffer tank and the supply device of the at least one consumer assembly drops below a predetermined eighth pressure within the tenth period of time.

In this preferred embodiment the consumer assembly in question is tested by pressurizing the water in the conduits whether there is a leak. In case a pressure drop is detected after the pump was switched off this indicates the presence of a leak. In such case the corresponding failure signal is transmitted through the aircraft data network (ADN).

In another preferred embodiment a pump is provided in a line connecting the supply device of at least one consumer assembly to the high-pressure conduit system and the method further comprises the following steps:
  operating the pump such that water is conveyed in the line connecting the supply device of the at least one consumer assembly to the high-pressure conduit system;
  monitoring the pressure in the line connecting the supply device of the at least one consumer assembly to the high-pressure conduit system for a predetermined eleventh period of time; and
  providing a tenth failure signal when the pressure in the line connecting the supply device of the at least one consumer assembly to the high-pressure conduit system remains below a predetermined nineth pressure within the eleventh period of time.

With this embodiment it is tested with whether the pump of the consumer assembly in question is operating properly, i.e., whether it is capable of building up a sufficient pressure in the conduit between the high-pressure conduit system and the supply device. In case a sufficient pressure level cannot be reached, a corresponding failure signal will be generated and transmitted via the aircraft data network (ADN). Here, it is to be noted that this method can also be applied in case of consumer assemblies having a buffer tank. Then the line being pressurized connects the supply device indirectly with the high-pressure conduit system.

In a further preferred embodiment, a pump is provided in a line connecting the supply device of at least one consumer assembly to the high-pressure conduit system and wherein the method further comprises the following steps:
  operating the pump such that water is conveyed in the line connecting the supply device of the at least one consumer assembly to the high-pressure conduit system;
  monitoring the flow in the line connecting the supply device of the at least one consumer assembly to the high-pressure conduit system for a predetermined twelfth period of time; and
  providing an eleventh failure signal when the flow in the line connecting the supply device of the at least one consumer assembly to the high-pressure conduit system remains below a predetermined second flow level within the twelfth period of time.

With this embodiment it is tested with whether the pump of the consumer assembly in question is also operating properly and whether, i.e., whether it is capable of providing a sufficient flow in the conduit between the high-pressure conduit system and the supply device, or whether there is a blockage in that conduit. In case such sufficient flow level cannot be reached, a corresponding failure signal will be generated and transmitted via the aircraft data network (ADN). This method can also be applied in case of consumer assemblies having a buffer tank. Then the line being pressurized connects the supply device indirectly with the high-pressure conduit system.

With regard to the disclosure herein and the preferred embodiments explained above it is to be noted that although some embodiments are merely described as being preferred, they are to be considered as a disclosure herein even when taken in isolation.

Furthermore, as can be taken from the above, some of the above embodiments of the method may be applied for on-board water supply systems without buffer tanks. In particular, this applies to those embodiments where the pressure in the high-pressure conduit system is monitored. Hence, the buffer tanks in the consumer assemblies are optional, even though it is preferred that each of the consumer assemblies are provided with such buffer tanks.

BRIEF DESCRIPTION OF DRAWINGS

Moreover, the above object is solved by an onboard water supply and distribution system of an aircraft which is configured to perform any of the above methods.

In the following, the disclosure herein will further be described with regard to the example embodiment shown in the drawings, wherein.

DETAILED DESCRIPTION

Figure 1:
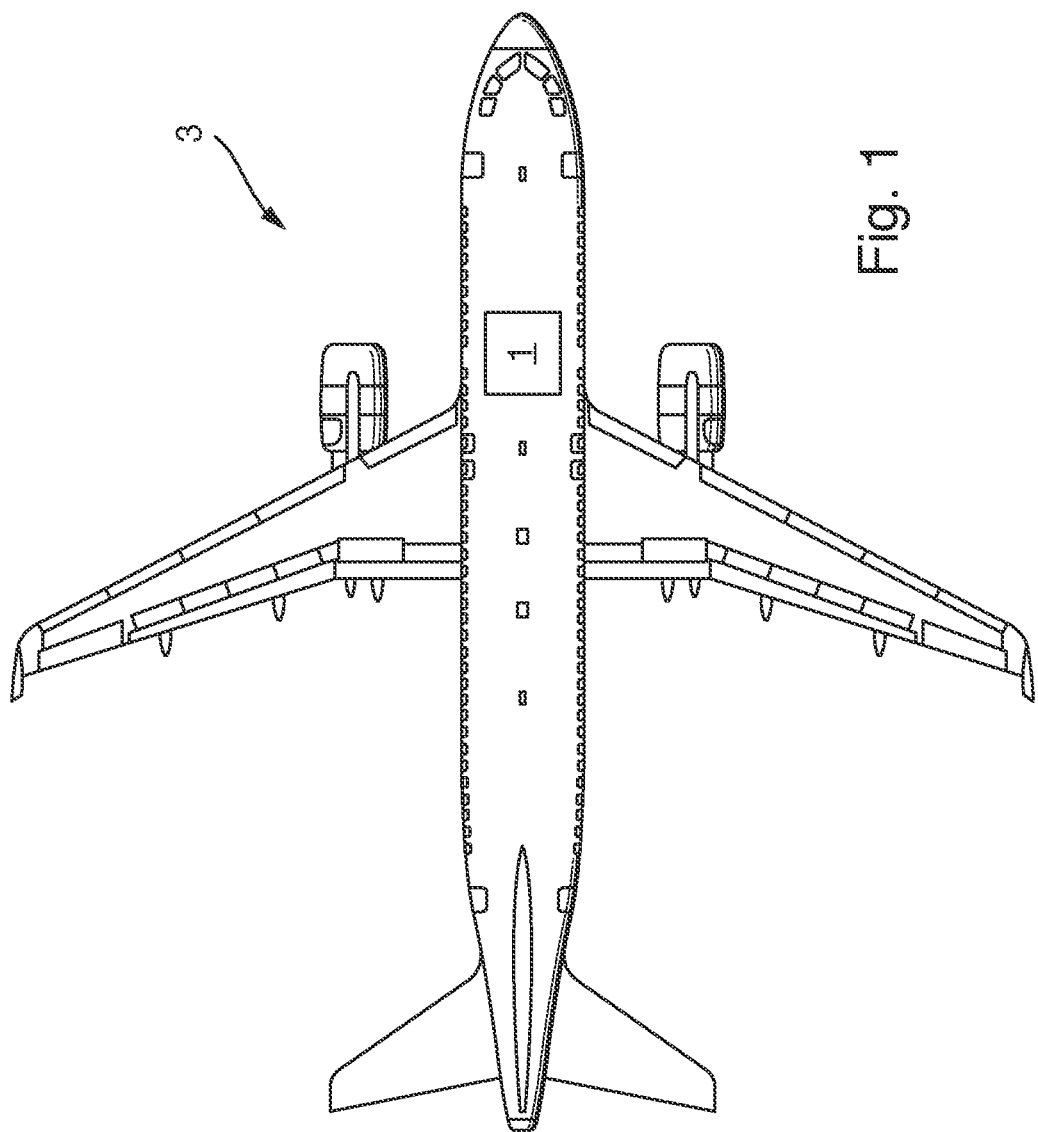
FIG. 1 shows an example embodiment of an aircraft having on-board water supply and distribution system.
Figure 2:
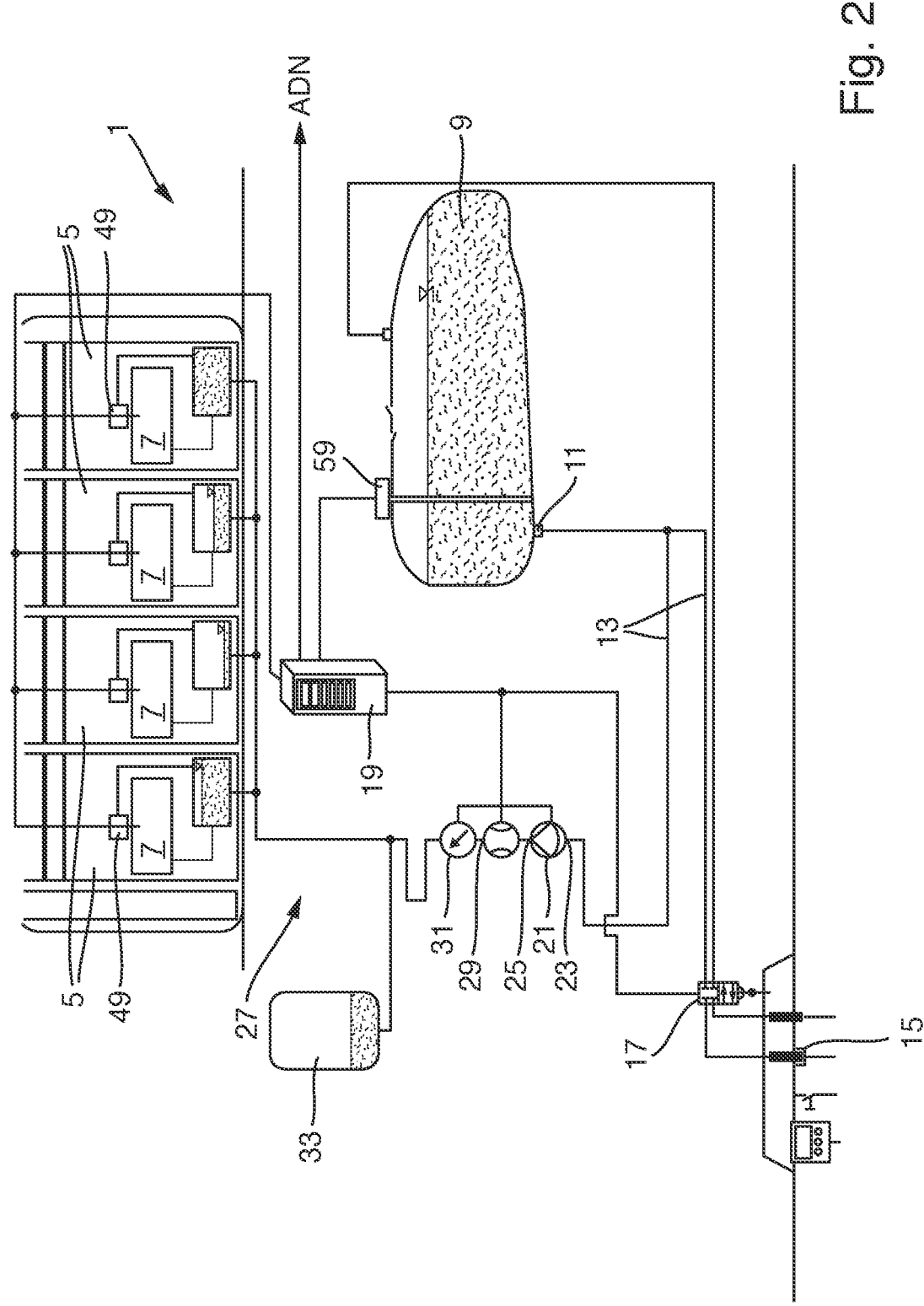
FIG. 2 shows a schematic drawing of an example embodiment of an on-board water supply and distribution system of an aircraft.

As can be taken from FIGS. 1 and 2 the example embodiment of a water supply and distribution system 1 is generally arranged on-board an aircraft 3 and configured such that it supplies a plurality of consumer assemblies 5 which comprise supply devices 7 such as sinks and toilets in a lavatory or steam ovens and sinks in a galley, with potable water as will be described in detail below. FIG. 1 only schematically shows the arrangement of the system 1 in the aircraft 3, and several types of arrangements are conceivable.

The water supply and distribution system 1 comprises a central water tank 9 which is provided with a connector 11 at its bottom. The connector 11 is connected to a supply line 13 which extends to a fill/drain coupling 15 with a valve 17 being arranged in the supply line 13 adjacent to the fill/drain coupling 15. The valve 17 is connected to a control unit 19 of the system 1 and can remotely be controlled such that it can be switched between a closed and an open position. As can further be taken from FIG. 2, the supply line 13 also connects the connector 11 with a central pump 21. Preferably, the central pump 21 is configured as a positive displacement pump and further preferred as a gear pump or a diaphragm pump.

Furthermore, the central pump 21 is also connected to the control unit 19 and can be operated in a supply mode where it conveys and pressurizes water or other media such as ambient air from its upstream side 23 and the supply line 13 to its downstream side 25 that is connected to a high-pressure conduit system 27 which will be described in detail below. The downstream side 25 of the central pump 21 is equipped with a flow sensor 29 and a pressure sensor 31 which are both connected with the control unit 19 and which are capable of monitoring the flow rate of the water conveyed by the central pump 21 and the pressure the water supplied by the pump 21 has.

In addition, it is to be noted that it is preferred that either the central pump 21 is provided with a backflow prevention mechanism (not shown), which prevents water and/or a gas to flow in an opposite direction from the downstream side 25 to the upstream side 23 when the pump 21 is not operated, or an additional backflow prevention valve (not shown) is provided which is closed, when the central pump 21 is not operated and prevents water and/or a gas to flow from the downstream side 25 to the upstream side 23.

The high-pressure conduit system 27 comprises a plurality of conduits connecting the downstream side 25 of the central pump 21 with the consumer assemblies 5. In addition, in this preferred embodiment, the high-pressure conduit system 27 comprises a pressure reservoir 33 that is configured such that that it applies a pressure at a reservoir pressure level to the high-pressure conduit system 27. The reservoir pressure level being the level the pressure has after operation of the central pump 21 has been stopped so that the reservoir pressure level is the level the pressure in the high-pressure conduit system 27 has at that point in time where the central pump 21 was stopped. The pressure reservoir 33 can be in the form of a tank containing a gas volume and an elastic membrane that separates the gas volume from a further volume being connected to the high-pressure conduit system and receiving water and/or gas such as ambient air from the conduit system, i.e., the pressure reservoir 33 can be configured in a similar form as in conventional compressors. However, any spring element with reversible spring-back behavior may be employed to bias a membrane or a piston which are part of the reservoir 33. Metallic or rubber bellows may also be used. Further, an arrangement with a spring-loaded piston that exerts a pressure on a cylinder connected to the high-pressure conduit system 27 is also conceivable. Finally, the piston in such an arrangement may also be coupled with a linear actuator rather than a spring.

Figure 3:
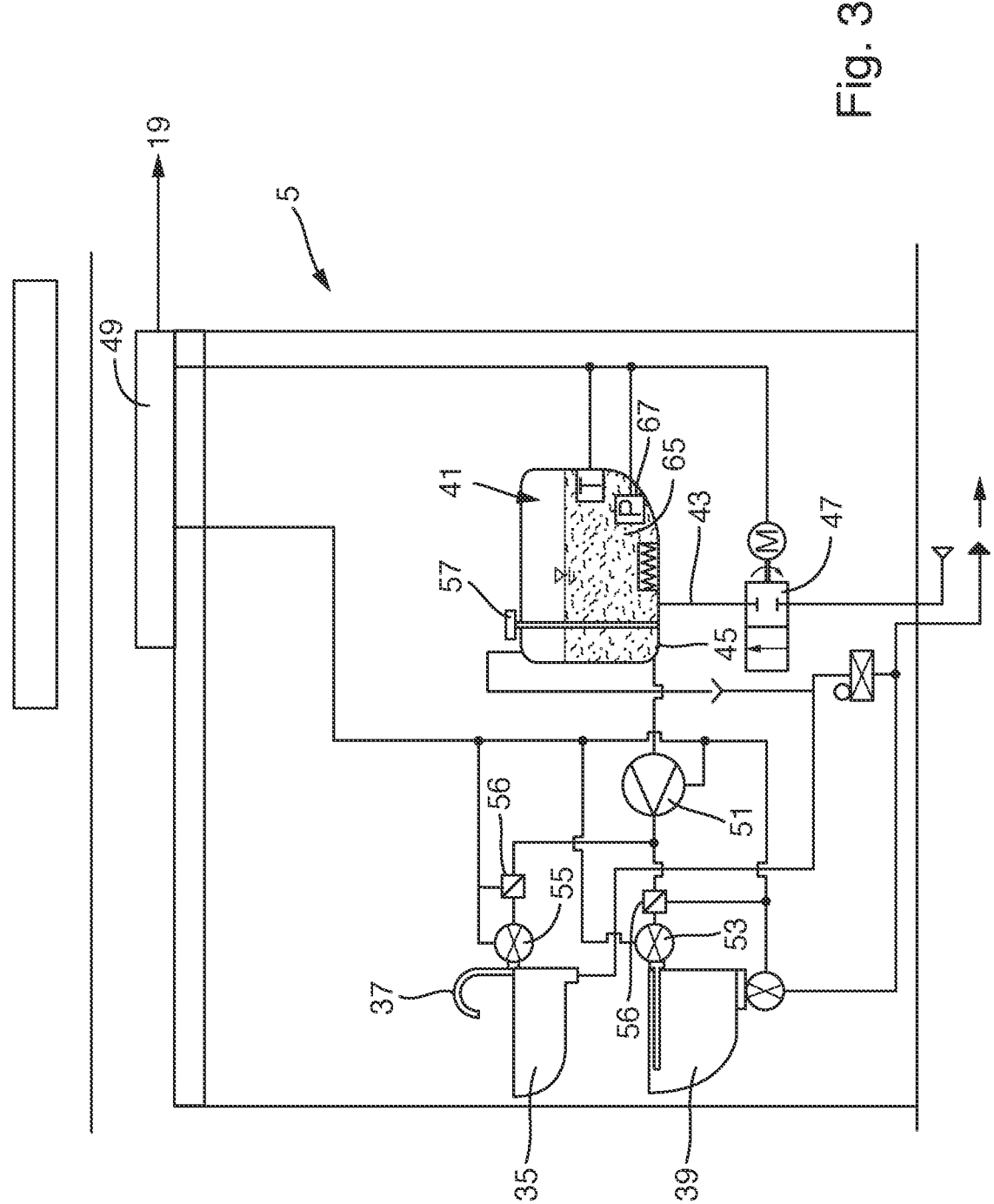
FIG. 3 shows a schematic drawing of an example embodiment of a consumer assembly of the on-board water supply and distribution system of FIG. 2.
Figure 6A:
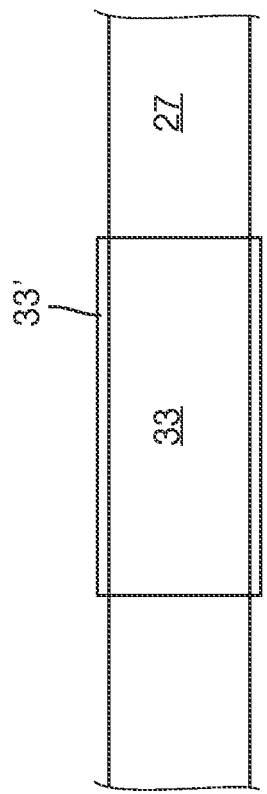
FIGS. 6a and 6b show schematic drawings of an embodiment of a pressure reservoir in the high-pressure conduit system.
Figure 6B:
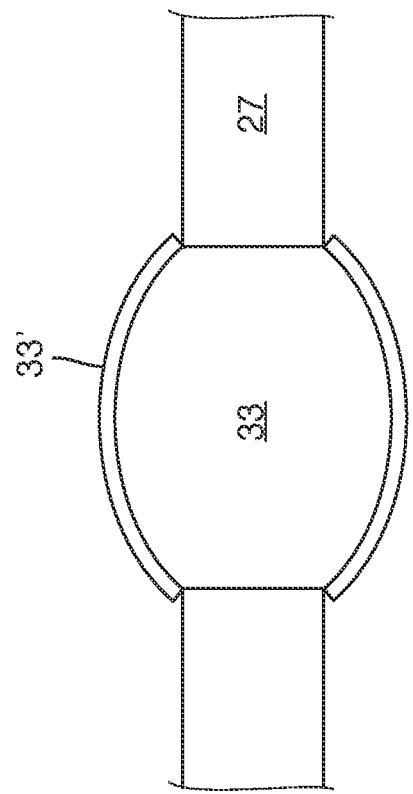

A further embodiment of a pressure reservoir 33 in the high-pressure conduit system 27 is shown FIGS. 6a and 6b. In this embodiment the component of the high-pressure conduit system having compressibility is an elastic hose element 33'. When the water in them high pressure conduit system 27 is not pressurized, the elastic hose element 33' is not deformed (see FIG. 6a). However, the elastic hose element 33' has spring back behavior so that it deforms when the water in the high-pressure conduit system 27 is pressurized by the central pump 21, as can be seen in FIG. 6b. In this configuration it applies a pressure on to the water in the system 27 when operation of the pump 21 is stopped, i.e., it acts to maintain the pressure in the system. The consumer assembly 5 shown in FIG. 3 is configured as a lavatory with a sink 35 provided with a faucet 37 and a toilet 39 as supply devices 7. Here, it is to be noted that other forms of consumer assemblies are conceivable such as galleys having sinks etc. and that the disclosure herein is not limited to consumer assemblies in the form of lavatories. In particular, since galleys are provided with buffer tanks that have a larger capacity than those of lavatories, the buffer tanks of galleys may play a more important role in the method of the disclosure herein, as will become clear below.

Furthermore, the consumer assembly 5 comprises a buffer tank 41 having an inlet 43 and an outlet 45, the inlet 43 being provided with an inlet valve 47 which is connected to a control device 49 which in turn is connected to the control unit 19 so that each of the consumer assemblies 5 can be controlled by and can send signals to the control unit 19 via a data network.

The position of the inlet valve 47 can be controlled by the control device 49. The outlet 45 is connected to the faucet 37 and the toilet 39 via a micro pump 51. As can further be taken from FIG. 3, the line connecting the micro pump 51 with the toilet 39 is also provided with a valve 53 that is controlled by the control device 49. Similarly, the line connecting the micro pump 51 with the faucet 37 is also provided with a valve 55 connected to and controlled by the control device 49. Finally, in the lines connecting the outlet of the micro pump 51 with the valves 53, 55 on the toilet 39 and the faucet 37 combined sensors 56 are provided which sensors 56 are configured such that they monitor both the pressure and the flow rate in the line between the respective valve 53, 55 and the micro pump 51. However, it is also conceivable, that a sole combined sensor 56 is provided on the outlet of micro pump 51 so that the output pressure as well as the flow rate which the water is supplied by the micro pump 51 can be monitored by the control unit 19.

The buffer tank 41 of each consumer assembly 5 is provided with a level sensor 57 which is connected to the control device 49 and, hence, also to the control unit 19. The level sensor 57 is configured such that it provides a signal to the control device 49 indicating the fill level in the buffer tank 41.

A similar manner, the central tank 9 is provided with a level sensor 59 that is connected to the control unit 19 so that the fill level in the central tank 9 can also electronically be determined by the control unit 19.

Finally, the inlet 43 of the buffer tank 41 of each of the consumer assemblies 5 is connected to the downstream side 25 of the central pump 21 via the high-pressure conduit system 27 and the inlet valve 47, so that the buffer tanks 41 can be supplied with water by the central pump 21.

The control unit 19 of the system 1 in combination with the control device 49 of each of the consumer assemblies 5 are configured such that they operate the system 1 and especially the central pump 21 in this example embodiment in the following manner:

During normal operation the central pump 21 is constantly or intermittently operated in a supply mode so that water from the central tank 9 is delivered to the consumer assemblies 5 and their buffer tanks 41, which are connected to the downstream side 25 of the pump 21 via the high pressure conduit system 27, so that the buffer tanks 41 of the consumer assemblies 5 are filled. In particular, in this step the inlet valves 47 of those consumer assemblies 5 the buffer tanks 41 of which shall be filled are at the same time or a subsequently brought into its open position. The level in the buffer tanks 41 may be monitored by the level sensors 57. Further, the water may be supplied from the buffer tank 41 to the faucet 37 or the toilet 39 by operating the micro pump 51 and opening the respective valves 53, 55.

In addition, to ensure that the above described system is properly operating and no leaks or blockages are present in the entire system or at least that such leaks or blockages are detected at an early stage, the following safety procedures may be performed by the control unit 19 and the control devices 49 of the consumer assemblies 5 when starting the aircraft or during operation, with the control unit 19 and the control devices 49 being configured correspondingly:

Procedure/Logic 1:
  Operating the central pump 21 such that a gas such as ambient air, drawn in by the pump 21, e.g., via the fill drain coupling 15 or via an overflow line in the central water tank 9, and supplied to the high-pressure conduit system 27 is pressurized to a predetermined pressure monitored by the control unit 19 via the pressure sensor 31;
  operating the consumer assemblies 5 by the control devices 49 such that in each of the consumer assemblies 5 the inlet valve 47 is in a closed position, so that air is prevented from passing from the high-pressure conduit system 27 into the buffer tank 41;
  monitoring the pressure in the high-pressure conduit system 27 with the pressure sensor 31 for a predetermined period of time;
  providing a corresponding failure signal by the control unit 19 to the aircraft data network ADN of the aircraft 3 when the pressure in the high-pressure conduit system 27 drops below a predetermined pressure within the period of time. In particular, a test-passed signal may be transmitted in case the pressure does not drop below the predetermined pressure within the period of time.

With this procedure it can simply be determined whether there is a leak in the high-pressure conduit system 27 without the high-pressure conduit system being filled with water. In turn, it is to be noted that this procedure can only be carried out when the central tank 9 and the high-pressure conduit system 27 must be drained.

Procedure/Logic 2:
  Monitoring the level in the central tank 9, e.g., via the level sensor 59, when the central pump 21 is not operated so that it does not convey water from the upstream side 23 to the downstream side 25; and
  providing a corresponding failure signal by the control unit 19 when the level in the central water tank decreases by more than a predetermined amount within a predetermined period of time.

This procedure allows to determine whether the central tank 9 and the supply line 13 to the central pump 21 comprise any leakages. In case the level in the central tank 21 decreases by more than the predetermined amount, the corresponding failure signal is generated and supplied to the aircraft data network ADN.

Procedure/Logic 3:
  Pressurizing gas, preferably ambient air, in the high-pressure conduit system 27 to a predetermined third pressure, preferably by the central pump 21;
  operating the consumer assemblies 5 such that in each of the consumer assemblies 5 the connection between the buffer tank 41 of the consumer assembly 5 and the high-pressure conduit system 27 is in a closed position by closing the valve 47;
  monitoring the pressure in the high-pressure conduit system 27 for a predetermined period of time by the pressure sensor 31; and
  providing a corresponding failure signal by the control unit 19 to the aircraft data network ADN when the pressure in the high-pressure conduit system 27 drops below a predetermined pressure within the period of time.

With this procedure it can also simply be determined whether there is a leak in the high-pressure conduit system 27. However, this test may also be performed during normal operation, because different from Procedure 1 it is not required that the high-pressure conduit system is filled with gas instead of water.

Furthermore, approaches other than the central pump 29 may by employed as the source for pressurized gas. In particular, a ground pressure source may be used or the high-pressure conduit system 27 may be configured such that it comprises an interface which can connected to an interface of the cabin pressurization system or, as an alternative, it may also be connected to an interface of the bleed air system.

Procedure/Logic 4:
  Operating the central pump 21 such that water is conveyed from the upstream side 23 to the downstream side 25, into the high-pressure conduit system 27 and into the buffer tank 41 of one of the consumer assemblies 5;
  monitoring by the control devices 49 whether the level in the buffer tank 41 of the one of the consumer assemblies 5 increases by more than a predetermined first filling level difference via the level sensors 57;
  providing a corresponding failure signal when the level in the buffer tank 41 of the one of the consumer assemblies 5 has not increased by the predetermined filling level difference within a predetermined period of time, preferably wherein the flow of water from the upstream side 23 to the downstream side 25 and into the high-pressure conduit system 27 is monitored by the control unit 19 and the flow sensor 29 so that the predetermined period of time is calculated by the control unit 19 based on the monitored flow of water from the upstream side 23 to the downstream side 25 and into the high-pressure conduit system 27.

Firstly, this procedure allows to determine whether in at least one of the consumers assemblies 5 a leak is present. Further, this procedure generally allows, in combination with Procedure 1 or 3, to determine in which path to the consumer assemblies 5 a leak is present when a failure signal was generated by Procedure 1 or 3. For this purpose, the procedure has to be carried out with the buffer tank 41 of each of the consumer assemblies 5 subsequently being filled until a failure signal is generated (see Procedure 6). Moreover, if Procedures 1 or 2 do not identify a leak, but the time required for achieving a certain difference in the filling level in this procedure is above the predefined limit, a partial or total blockage can also be present (upstream or downstream the pump).

Procedure/Logic 5:
Operating the central pump 21 by the control unit 19 such that water is conveyed from the upstream side 23 to the downstream side 25, into the high-pressure conduit system 27 and into the buffer tank 41 of at least one of the consumer assemblies 5;
monitoring whether the level in the buffer tank 41 of the at least one of the consumer assemblies 5 increases by more than a predetermined filling level difference via the control device 49 and the level sensor 57;
stopping operation of the central pump 21 by the control unit 19 and preferably closing the inlet valve 47, when the level in the buffer tank 41 of the at least one of the consumer assemblies 5 has increased by more than the predetermined filling level difference; further the valves 53, 55 in the conduits to the supply devices 37, 39 are also closed;
monitoring whether the level in the buffer tank 41 of the at least one of the consumer assemblies 5 decreases by more than a predetermined filling level difference by the level sensor 57 and the control device 49; and
providing a corresponding failure signal to the aircraft data network ADN by the control unit 19 when the level in the buffer tank 41 of the at least one of the consumer assemblies 5 has decreased by more than the predetermined filling level difference within a predetermined period of time.

This procedure allows to check whether there is any leakage in the monument comprising that consumer assembly 5 the level in the buffer tank 41 is monitored.

Procedure/Logic 6:
Operating the central pump 21 such that water is conveyed from the upstream side 23 to the downstream side 25, into the high-pressure conduit system 27 and into the buffer tank 41 of each of the consumer assemblies 5, wherein the buffer tanks 41 are subsequently filled such that at one point in time only one of the consumer assemblies 5 is supplied with water;
monitoring whether the level in the buffer tank 41 of each of the consumer assemblies 5 increases by a predetermined first filling level difference; and
providing the fourth failure signal when for at least one of the consumer assemblies 5 the time between the start of the filling of its buffer tank 41 and of reaching the predetermined first filling level difference exceeds the predetermined period of time.

Again, the flow of water from the upstream side 23 to the downstream side 25 and into the high-pressure conduit system 27 can be monitored by the control unit 19 and the flow sensor 29 so that the predetermined period of time is calculated by the control unit 19 based on the monitored flow of water from the upstream side 23 to the downstream side 25 and into the high-pressure conduit system 27.

When combined with Procedure 5, this procedure allows to check whether any blockages are in the path between the central pump 21 to the buffer tank 41 each of the consumer assemblies 5, because the respective test is conducted for each of the consumer assemblies 5 separately. However, for confirming that a leak or blockage is present in that region it is additionally required that a certain minimum pressure of the pump 21 is reached. Otherwise, the pump 21 could also be damaged or it could have a leak.

Procedure/Logic 7a:
Operating the central pump 21 by the control unit 19 such that water is conveyed from the upstream side 23 to the downstream side 25 and into the high-pressure conduit system 27;
monitoring the pressure in the high-pressure conduit system 27 for a predetermined period of time by the control unit 19 via the pressure sensor 31; and
providing a corresponding failure signal by the control unit 19 to the aircraft data network ADN when the pressure in the high-pressure conduit system 27 remains below a predetermined pressure within the third period of time.

When Procedures 5 and 6 have subsequently been conducted before and no failure signals were generated, i.e., no leaks and or blockages were detected downstream the central pump 21, this procedure allows to check whether any blockages are present in the path between the central tank 9 and the central pump 21 and whether the central pump 29 is operating properly.

Procedure/Logic 7b:
Operating the central pump 21 by the control unit 19 such that water is conveyed from the upstream side 23 to the downstream side 25 and into the high-pressure conduit system 27;
monitoring the flow of water from the upstream side 23 to the downstream side 25 and into the high-pressure conduit system 27 for a predetermined period of time by the control unit 19 and the flow sensor 29;
providing a corresponding failure signal by the control unit 19 to the aircraft data network ADN when the flow of water from the upstream side 23 to the downstream side 25 and into the high-pressure conduit system 27 remains below a predetermined flow level within the predetermined period of time.

Similar to Procedure 7a, this procedure, when combined with Procedure 6, also allows to check whether any blockages are present in the path between the central tank 9 and the central pump 21 and whether the pump is operating in the right manner. Further it is to be noted, that the flow of water through the central pump 21 can be measured by the flow sensor 29 or inverse methods may also be used such as detecting the rotational speed of the central pump 21 to derive the flow if the pressure is measured by the pressure sensor 31 downstream the central pump 21.

Procedure/Logic 8:
Operating the central pump such that water is conveyed from the upstream side to the downstream side and into the high-pressure conduit system;
monitoring the flow of water from the upstream side to the downstream side and into the high-pressure conduit system for a predetermined eighth period of time;
operating a first group of the consumer assemblies such that the inlet valve is open during the predetermined period of time, so that water is supplied to the buffer tank of the of the consumer assemblies of the first group;

operating a second group of the consumer assemblies such that water is supplied from the buffer tank via the supply device 7 of the consumer assemblies of the second group with the flow of supplied water through the supply device being monitored during the eighth period of time, e.g. by monitoring the level change in the respective buffer tank 41, via operating parameters of the associated micro pump 51, with a flow sensor associated to the supply device or on the basis of a nominal flow value of the respective supply device;

monitoring the level in the buffer tanks of the consumer assemblies of the first and the second group of consumer assemblies during the eighth period of time;

determining from the change of the monitored level in the buffer tank of the consumer assemblies of the first and the second group of consumer assemblies the total change of the amount of water received in the buffer tanks (41) of the consumer assemblies in the eighth period of time;

determining by the control unit 19 from the monitored flow of water from the upstream side 23 to the downstream side the total amount of water supplied by the central pump 21 to the consumer assemblies in the eighth period of time;

determining from the monitored flow of supplied water from the buffer tanks (41) through the supply device of the consumer assemblies of the second group of consumer assemblies the amount of water supplied by the consumer assemblies in the eighth period of time; and providing a seventh failure signal when the change of the amount of water received in the buffer tanks in the eighth period of time differs from the total amount of water supplied by the central pump minus the amount of water supplied by the second group of consumer assemblies in the eighth period of time by more than a predetermined value.

This procedure also allows to determine whether in the path between the central pump 21 and the supply device of the one consumer assembly 5 leaks are present.

Procedure/Logic 9:

Operating the supply device 7 of one of the consumer assemblies 5 such that water from the buffer tank 41 of the one consumer 5 assembly is supplied via the supply device 7, such as a faucet 37 or toilet 39, for a predetermined period of time;

monitoring the filling level in the buffer tank 41 of the one consumer assembly 5 during the predetermined period of time; and providing a seventh failure signal when the change of filing level in the buffer tank 41 of the one consumer assembly 5 during the eighth period of time is below a second predetermined value.

With this preferred embodiment the supply device, i.e., the faucet 37 or the toilet 39, and the connection between the buffer tank 41 and the supply device 7 is checked whether there is any kind of blockage. In such case the drop of the filling level in the respective buffer tank 41 would remain below a predetermined value. If this is detected a further failure signal is generated and transmitted via the aircraft data network ADN. On the other hand, if the pressure drop is above the predetermined value, a test-passed signal may again be generated.

Therefore, with Procedure 9 it is possible to check whether the supply devices 7 of the consumer assemblies 5 are operating properly.

Procedure/Logic 10a:

Pressurizing gas, such as ambient air, in at least one consumer assembly 5 in its line connecting the supply device 7, such as the faucet 37 or the toilet 39, to the high-pressure conduit system 27, which can also be the line with the pump 51 connecting the buffer tank 41 and the supply devices 7; in particular, the gas may be pressurized by the pump 51 of the consumer assembly 5;

monitoring the pressure in the line connecting the supply device 7 of the consumer assembly 5 to the high-pressure conduit system 27 or the buffer tank 41 e.g. via at least one of the sensors 56 for a predetermined period of time; and providing an eighth failure signal when the pressure in the line connecting the supply device 5 of the consumer assembly 5 to the high-pressure conduit system 27 or the buffer tank 41 drops below a predetermined pressure within the period of time.

With this procedure it can be tested, preferably when the valve 53, 55 of the supply device 7 such as the toilet 39 or the faucet 37 are in a closed position, whether there is a leak in the conduits of the consumer assembly 5. When it is detected that the gas pressure in the pressurized conduit drops below the predetermined threshold, a corresponding failure signal is generated and transmitted through the aircraft data network (ADN).

Procedure/Logic 10b:

Operating the pump 51 of a consumer assembly 5 such that water in the line connecting the buffer tank 41 and the supply device 7, such as the faucet 37 or the toilet 39, of the consumer assembly 5 is pressurized to a predetermined pressure;

monitoring the pressure in the line connecting the buffer tank 41 and the supply device 7 of the consumer assembly 5 e.g. via sensor 56 for a predetermined period of time; and providing a failure signal, e.g., via the aircraft data network ADN, when the pressure in the line connecting the buffer tank 41 and the supply device 7 of the consumer assembly 5 drops below a predetermined pressure within the period of time.

In this procedure the consumer assembly 5 in question is tested by pressurizing the water in the conduits whether there is a leak. In case a pressure drop is detected after the pump 51 was switched off this indicates the presence of a leak. In such case the corresponding failure signal is transmitted through the aircraft data network (ADN).

Procedure/Logic 10c:

Operating the pump 51 such that water is conveyed in the line connecting the supply device 7 of a consumer assembly 5, such as the faucet 37 or the toilet 39, to the high-pressure conduit system 27 or the buffer tank 41;

monitoring the pressure in the line connecting the supply device 7 the consumer assembly 5 to the high-pressure conduit system 27 or the buffer tank 41 e.g. via sensor 56 for a predetermined period of time; and providing a failure signal when the pressure in the line connecting the supply device 7 of the consumer assembly 5 to the high-pressure conduit system 27 or buffer tank 41 remains below a predetermined pressure within the period of time.

With this procedure it is tested with whether the pump 51 of the consumer assembly 5 in question is operating properly, i.e., whether it is capable of building up a sufficient pressure in the conduit between the buffer tank 41 and the supply device 7. In case a sufficient pressure level cannot be reached, a corresponding failure signal will be generated and transmitted via the aircraft data network (ADN).

Procedure/Logic 10d:

Operating the pump 51 such that water is conveyed in the line connecting the supply device 7 of a consumer assembly 5, such as the faucet 37 or the toilet 39, to the high-pressure conduit system 27 or the buffer tank 41;

monitoring the flow in the line connecting the supply device 7, such as the faucet 37 or the toilet 39, of the at least one consumer assembly 5 to the high-pressure conduit system 27 for a predetermined period of time; and providing a failure signal when the flow in the line connecting the supply device 7 of the consumer assembly 5 to the high-pressure conduit system 27 remains below a predetermined second flow level within the period of time.

With this embodiment it is again tested with whether the pump 51 of the consumer assembly 5 in question is also operating properly, i.e., whether it is capable of providing a sufficient flow in the conduit between the buffer tank 41 and the supply device 7, or whether there is a blockage in that conduit. In case such sufficient flow level cannot be reached, a corresponding failure signal will be generated and transmitted via the aircraft data network (ADN).

Figure 4:
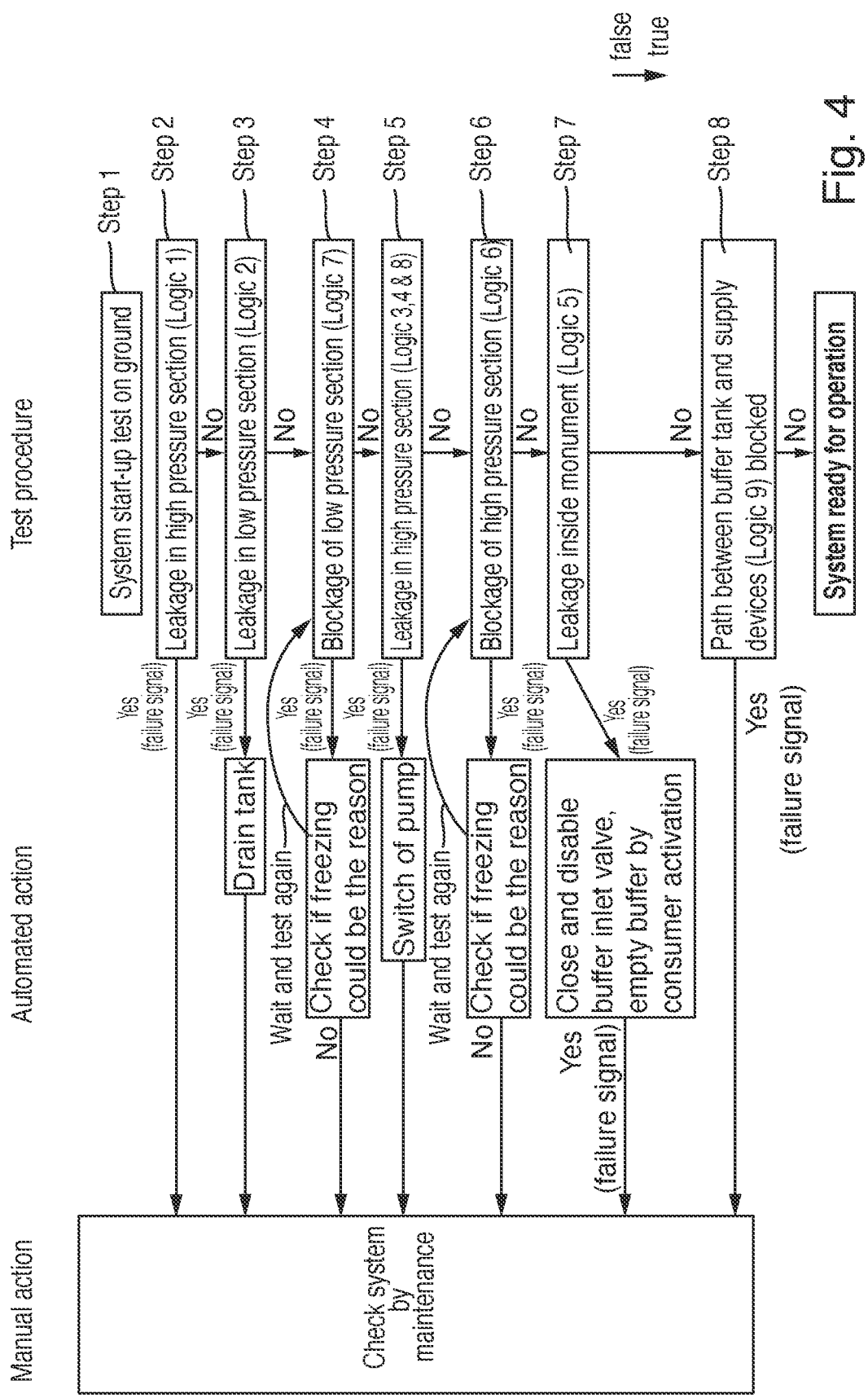
FIG. 4 shows a flow chart of a first example embodiment of a method of the disclosure herein.

As can be taken from FIG. 4, a preferred embodiment for a test procedure during start-up of an aircraft or for a general system test is initiated in step 1. In the subsequent step 2 above Procedure 1 is conducted, and in case a failure signal is generated, the test procedure stops and it will be required that the on-board supply system is sent to a maintenance procedure. In case in step 2 no leakage is detected, step 3 is conducted, i.e., above Procedure 2 is performed. In case a failure signal is generated in this step, the central tank 9 is automatically drained and it is again required that a maintenance procedure is conducted.

If in step 3 no leakage is found, the test procedure proceeds to step 4 where Procedure 7 is performed. In case in step 4 a failure signal is generated indicating that a blockage or pump malfunctioning is present upstream the central pump 21, Procedure 7 is repeated so as to rule out that the blockage is due to freezing in the low-pressure section. Additionally, the ambient temperature may be monitored, so as to determine whether freezing is the reason for the problem. In case the problem continues to be present, the test procedure stops, and a maintenance procedure will again be required.

When in step 4 no blockage or pump malfunctioning is found, the test procedure proceeds to step 5 where above Procedures 3, 4 and 8 are performed. If in this step again a leakage in the high pressure conduit system 27 is detected, the central pump 21 is automatically switched off, the test procedure stops and a maintenance procedure will be initiated.

In case in step 5 no leakage is detected, the test procedure proceeds to step 6, and above Procedure 6 is performed. If in this step a blockage is detected, Procedure 6 is repeated to again rule out that freezing is the reason. In case the problem continues to be present, the test procedure stops by initiating a maintenance procedure.

When in step 6 no blockage is detected, the test procedure proceeds to step 7 where above Procedures 5 and 10a to 10d are conducted. In case a failure signal is generated that monument where the leakage or blockage was detected is disabled by closing the respective inlet valve 47, and the buffer tank 41 is emptied manually.

In case in step 7, no leakage is detected, the test procedure proceeds to step 8, and Procedure 9 is carried out to check whether there are any blockages in the connections between the buffer tanks 41 and the supply devices. If this does not reveal any issues, the test procedure proceeds to the end and normal operation of the aircraft can be initiated.

More preferably only a subset of the defined possible test procedures will be conducted during aircraft start-up in order to be fast and efficient. At the same time, certain tests can also be carried out after a predefined time period has elapsed, for example every 10 days or every 20 flight cycles. Furthermore, it is also conceivable that different combinations of procedures are conducted in order to further localize a leak or blockage, when a failure was detected in one of the aforementioned steps.

Figure 5:
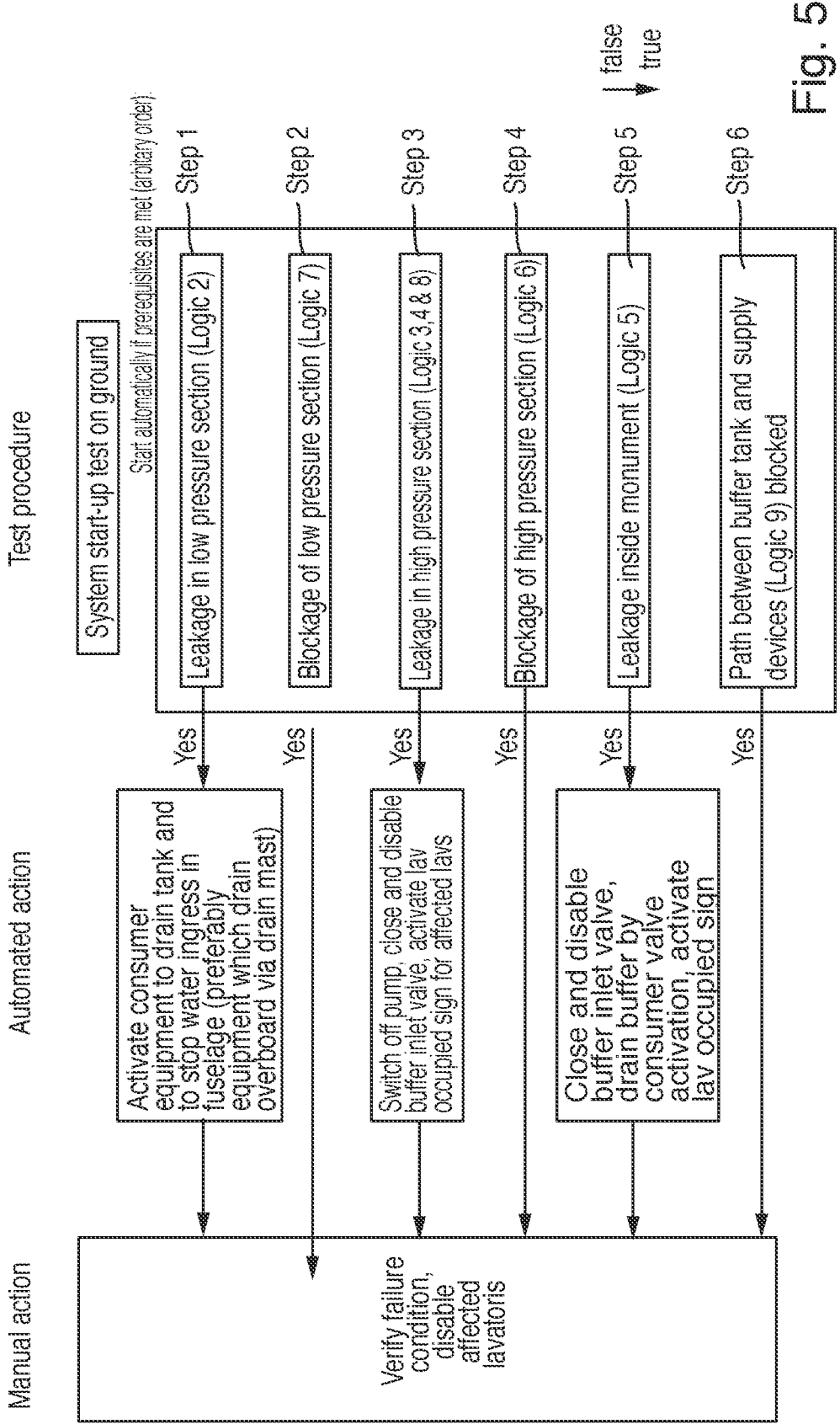
FIG. 5 shows a flow chart of a second example embodiment of a method of the disclosure herein.

As it is shown in FIG. 5, the preferred embodiment of a test procedure during operation of an aircraft 3, i.e., when the aircraft is in flight, includes the following steps 1 to 5 which can be performed in an arbitrary order and depending on the actual use of the onboard supply system 1. In particular, the respective tests can be carried out continuously in an arbitrary order and based on the operating parameters which are available on the aircraft data network ADN. Operational interruptions of the system are not required.

In step 1, above Procedure 2 is conducted. This can be done whenever the pump 21 is not in use. In case in this procedure a leakage in the low-pressure section upstream the central pump 21 is detected, the central tank 9 is automatically drained so as to prevent water ingress in the fuselage of the aircraft 3.

Step 2 can be carried out during normal use whenever the pump is not operating. Here, above procedure 7 is conducted. In case a blockage in the section upstream the central pump 21 is detected, those consumer assemblies 5 such as lavatories are disabled which are affected by the blockage.

In step 3, Procedures 3, 4 and 8 are carried out, which requires at that time that it is not needed to transfer water via the high-pressure conduit system. In case these procedures detect a leakage, the pump 21 is switched off if necessary, the inlet valve 47 of the consumer assembly 5 where a leak is detected is closed and/or the sign "lav occupied" may be activated.

In step 4 above Procedure 6 is executed. If it turns out that a blockage is present, the respective sections and consumer assemblies 5 are again disabled.

In step 5 Procedures 5 and 10a to 10d are carried out. In case this procedure detects leakages or blockages, the respective inlet valves 47 of the consumer assemblies 5 are closed and the buffer tanks 41 of these assemblies are automatically drained.

Finally, in step 6 it is checked whether the path between the buffer tanks 41 and the respective supply devices 7 (Procedure 9) are working properly.

In case a failure is detected in one of the above steps, the crew is informed and automated actions are possible as already indicated, e.g., switching off the central pump 21, close inlet valves 47 etc. In addition, manual crew actions may also be required after the crew has been informed, e.g., verify failures, and disable/close lavatories. Furthermore, it is to be noted that different from the above steps other combinations of procedures may be conducted in order to further localize a leak or blockage, when a failure was detected in one of the aforementioned steps.

However, a system test can also be initiated by the cabin crew via the flight attendant panel or by the flight crew via the aircraft maintenance system in case they assume a leak or a malfunction of the water system for example an abnormal low water tank capacity or low water pressure at the point of use.

It can be taken from the above description of the preferred embodiments, that the disclosure herein provides for an efficient method to check the status of an on-board water supply and distribution system without the need to visually inspect such system.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 1 water supply and distribution system
3 aircraft
5 consumer assembly
7 supply device
9 central water tank
11 connector
13 supply line
15 fill/drain coupling
17 valve
19 control unit
21 central pump
23 upstream side—pump
25 downstream side—pump
27 high-pressure conduit system
29 flow sensor
31 pressure sensor
33 pressure reservoir
35 sink
37 faucet
39 toilet
41 buffer tank
43 inlet
45 outlet
47 inlet valve
49 control device
51 micro pump
53 valve
55 valve
56 sensor
57 level sensor
59 level sensor

The invention claimed is:

1. A method for operating an on-board water supply and distribution system of an aircraft for supplying water,
the system comprising:
a central water tank;
a central pump that has an upstream side and a downstream side, wherein the central pump is configured for conveying and pressurizing water from the upstream side to the downstream side;
consumer assemblies, each comprising a supply device and each configured to supply water via the supply device; and
a high-pressure conduit system;
wherein the central water tank is connected to the upstream side;
wherein the high-pressure conduit system connects the downstream side with the consumer assemblies; and
wherein the high-pressure conduit system, when the central pump is operating, is configured for delivering water from the downstream side to the consumer assemblies:
the method comprising:
operating the central pump such that water in the high-pressure conduit system is pressurized to a predetermined first pressure;
operating the consumer assemblies such that, in each of the consumer assemblies, a connection between the consumer assembly and the high-pressure conduit system is in a closed position;
monitoring pressure in the high-pressure conduit system for a predetermined first period of time; and
providing a first failure signal when the pressure in the high-pressure conduit system drops below a predetermined second pressure within the first period of time.

2. The method according to claim 1, wherein each of the consumer assemblies comprises an inlet valve connecting the high-pressure conduit system with a corresponding one of the consumer assemblies;
the method comprising:
pressurizing gas in the high-pressure conduit system to a predetermined third pressure;
operating the consumer assemblies such that, in each of the consumer assemblies, the inlet valve is in a closed position, so that the gas is prevented from passing from the high-pressure conduit system into the corresponding one of the consumer assemblies;
monitoring the pressure in the high-pressure conduit system for a predetermined second period of time; and
providing a second failure signal when the pressure in the high-pressure conduit system drops below a predetermined fourth pressure within the second period of time.

3. The method according to claim 1, comprising:
operating the central pump such that water is conveyed from the upstream side to the downstream side and into the high-pressure conduit system;
monitoring the pressure in the high-pressure conduit system for a predetermined third period of time; and
providing a third failure signal when the pressure in the high-pressure conduit system remains below a predetermined fifth pressure within the third period of time.

4. The method according to claim 1, comprising:
operating the central pump such that water is conveyed from the upstream side to the downstream side and into the high-pressure conduit system;
monitoring a flow of water from the upstream side to the downstream side and into the high-pressure conduit system for a predetermined fourth period of time;
providing a third failure signal when the flow of water from the upstream side to the downstream side and into the high-pressure conduit system remains below a predetermined first flow level within the fourth period of time.

5. The method according to claim 1, wherein at least one of the consumer assemblies comprises a buffer tank connected to the high-pressure conduit system and is configured to supply water from the buffer tank via the supply device;

the method comprising:

operating the at least one of the consumer assemblies such that the connection between the at least one of the consumer assemblies and the high-pressure conduit system is in an open position;

operating the central pump such that water is conveyed from the upstream side to the downstream side, into the high-pressure conduit system, and into the buffer tank of the at least one consumer assembly;

monitoring whether a level in the buffer tank of the at least one of the consumer assemblies increases by more than a predetermined first filling level difference; and providing a fourth failure signal when the level in the buffer tank of the at least one of the consumer assemblies has not increased by more than the predetermined first filling level difference within a predetermined fifth period of time.

6. The method according to claim 5, comprising:

monitoring a flow of water from the upstream side to the downstream side and into the high-pressure conduit system;

wherein the predetermined fifth period of time is calculated based on the monitored flow of water from the upstream side to the downstream side and into the high-pressure conduit system.

7. The method according to claim 1, wherein each of the consumer assemblies comprises a buffer tank connected to the high-pressure conduit system and is configured to supply water from the buffer tank via the supply device;

the method comprising:

operating the consumer assemblies such that the connection between the consumer assemblies and the high-pressure conduit system is in an open position:

operating the central pump such that water is conveyed from the upstream side to the downstream side, into the high-pressure conduit system, and into the buffer tank of each of the consumer assemblies, wherein the buffer tanks are subsequently filled such that, at one point in time, only one of the consumer assemblies is supplied with water;

monitoring whether a level in the buffer tank of each of the consumer assemblies increases by a predetermined first filling level difference; and providing a fourth failure signal when, for at least one of the consumer assemblies, a time between a start of the filling of the buffer tank associated therewith and of reaching the predetermined first filling level difference exceeds a predetermined fifth period of time.

8. The method according to claim 1, wherein at least one of the consumer assemblies comprises a buffer tank connected to the high-pressure conduit system and is configured to supply water from the buffer tank via the supply device;

the method comprising:

operating the at least one of the consumer assemblies such that the connection between the at least one of the consumer assemblies and the high-pressure conduit system is in an open position;

operating the central pump such that water is conveyed from the upstream side to the downstream side, into the high-pressure conduit system, and into the buffer tank of the at least one consumer assembly;

monitoring whether a level in the buffer tank of the at least one consumer assembly increases by more than a predetermined second filling level difference;

stopping operation of the central pump when the level in the buffer tank of the at least one of the consumer assemblies has increased by the predetermined second filling level difference;

monitoring whether a level in the buffer tank of the at least one consumer assembly decreases by more than a predetermined third filling level difference; and providing a fifth failure signal when the level in the buffer tank of the at least one of the consumer assemblies has decreased by more than the predetermined third filling level difference within a predetermined sixth period of time.

9. The method according to claim 1, wherein each of the consumer assemblies comprises a buffer tank connected to the high-pressure conduit system via an inlet valve and is configured to supply water from the buffer tank via the supply device;

the method comprising:

operating the consumer assemblies such that the connection between the consumer assemblies and the high-pressure conduit system is in an open position;

operating the central pump such that water is conveyed from the upstream side to the downstream side, and into the high-pressure conduit system;

monitoring a flow of water from the upstream side to the downstream side and into the high-pressure conduit system for a predetermined seventh period of time;

operating a first group of the consumer assemblies such that the inlet valve of each of the first group of the consumer assemblies is open during the seventh period of time, so that water is supplied to the buffer tank of the consumer assemblies of the first group;

operating a second group of the consumer assemblies such that water is supplied from the buffer tank via the supply device of the consumer assemblies of the second group with the flow of supplied water through the supply device being monitored during the seventh period of time;

monitoring a level in the buffer tanks of the consumer assemblies of the first group of consumer assemblies and the second group of consumer assemblies during the seventh period of time;

determining, from a change of the monitored level in the buffer tank of the consumer assemblies of the first group of consumer assemblies and the second group of consumer assemblies, a total change of an amount of water received in the buffer tanks of the consumer assemblies in the seventh period of time;

determining, by the control unit and from the monitored flow of water from the upstream side to the downstream side, a total amount of water supplied by the central pump to the consumer assemblies in the seventh period of time;

determining, from the monitored flow of supplied water from the buffer tanks through the supply device of the consumer assemblies of the second group of consumer assemblies, an amount of water supplied by the consumer assemblies in the seventh period of time; and providing a sixth failure signal when a change of the amount of water received in the buffer tanks in the seventh period of time differs from a total amount of water supplied by the central pump minus an amount of water supplied by the second group of consumer assemblies in the seventh period of time by more than a first predetermined value.

10. The method according to claim 1, wherein each of the consumer assemblies comprises a buffer tank connected to the high-pressure conduit system and is configured to supply water from the buffer tank via the supply device;
the method comprising:
operating the supply device of one of the consumer assemblies such that water from the buffer tank of the one consumer assembly is supplied via the supply device for an eighth period of time;
monitoring a level in the buffer tank of the one consumer assembly during the eighth period of time; and
providing a seventh failure signal when a change of filing level in the buffer tank of the one consumer assembly during the eighth period of time is below a second predetermined value.

11. The method according to claim 1, comprising:
operating at least one consumer assembly of the consumer assemblies such that the connection between the at least one consumer assembly and the high-pressure conduit system is in an open position;
pressurizing gas in the at least one consumer assembly, in a line connecting the supply device of the at least one consumer assembly to the high-pressure conduit system;
monitoring pressure in the line for a predetermined ninth period of time; and
providing an eighth failure signal when the pressure in the line drops below a predetermined sixth pressure within the ninth period of time.

12. The method according to claim 1, wherein:
at least one of the consumer assemblies comprises a buffer tank connected to the high-pressure conduit system and is configured to supply water from the buffer tank via the supply device; and
a pump is provided in a line connecting the buffer tank and the supply device of the at least one consumer assembly;
the method comprising:
operating the pump of the at least one consumer assembly such that water in the line is pressurized to a predetermined seventh pressure;
monitoring the pressure in the line for a predetermined tenth period of time; and
providing a ninth failure signal when the pressure in the line drops below a predetermined eighth pressure within the tenth period of time.

13. The method according to claim 1, comprising:
providing a pump in a line connecting the supply device of at least one consumer assembly to the high-pressure conduit system;
operating the at least one consumer assembly such that the connection between the at least one consumer assembly and the high-pressure conduit system is in an open position;
operating the pump such that water is conveyed in the line;
monitoring pressure in the line for a predetermined eleventh period of time; and
providing a tenth failure signal when the pressure in the line remains below a predetermined nineth ninth pressure within the eleventh period of time.

14. The method according to claim 1, comprising:
providing a pump in a line connecting the supply device of at least one consumer assembly to the high-pressure conduit system;
operating the pump such that water is conveyed in the line;
monitoring a flow in the line for a predetermined twelfth period of time; and
providing an eleventh failure signal when the flow in the line remains below a predetermined second flow level within the twelfth period of time.

15. An on-board water supply and distribution system of an aircraft configured to perform the method of claim 1.

16. The method according to claim 2, wherein the gas is in a form of ambient air in the high-pressure conduit system.

17. The method according to claim 11, wherein the gas is in a form of ambient air in the high-pressure conduit system.

18. A method for operating an on-board water supply and distribution system of an aircraft for supplying water,
the system comprising:
a central water tank;
a central pump that has an upstream side and a downstream side, wherein the central pump is configured for conveying and pressurizing water from the upstream side to the downstream side;
consumer assemblies that each comprise:
a supply device; and
a buffer tank;
wherein each consumer assembly is configured to supply water via the supply device; and
a high-pressure conduit system;
wherein the central water tank is connected to the upstream side;
wherein the high-pressure conduit system connects the downstream side with the consumer assemblies; and
wherein the high-pressure conduit system, when the central pump is operating, is configured for delivering water from the downstream side to the consumer assemblies;
the method comprising:
operating the central pump such that water in the high-pressure conduit system is pressurized to a predetermined first pressure;
operating the consumer assemblies such that, in each of the consumer assemblies, a connection between the buffer tank of the consumer assembly and the high-pressure conduit system is in a closed position;
monitoring pressure in the high-pressure conduit system for a predetermined first period of time; and
providing a first failure signal when the pressure in the high-pressure conduit system drops below a predetermined second pressure within the first period of time.

19. The method according to claim 18, wherein each of the consumer assemblies comprises an inlet valve connecting the high-pressure conduit system with a corresponding one of the consumer assemblies;
the method comprising:
pressurizing gas in the high-pressure conduit system to a predetermined third pressure;
operating the consumer assemblies such that, in each of the consumer assemblies, the inlet valve is in a closed position, so that the gas is prevented from passing from the high-pressure conduit system into the corresponding one of the consumer assemblies;
monitoring the pressure in the high-pressure conduit system for a predetermined second period of time; and
providing a second failure signal when the pressure in the high-pressure conduit system drops below a predetermined fourth pressure within the second period of time.

20. An on-board water supply and distribution system of an aircraft configured to perform the method of claim 18.

* * * * *